(12) United States Patent
Box

(10) Patent No.: US 10,065,350 B2
(45) Date of Patent: Sep. 4, 2018

(54) LIGHT GUIDE AND COVERING ELEMENT, INSTRUMENT PANEL AND METHOD FOR MANUFACTURING A DECORATIVE ELEMENT

(71) Applicant: Visteon Electronics France, Cergy Pontoise (FR)

(72) Inventor: Benoit Box, L'Isle Adam (FR)

(73) Assignee: VISTEON ELECTRONICS FRANCE, Cergy Pontoise Cedex (FR)

( * ) Notice: Subject to any disclaimer, the term of this patent is extended or adjusted under 35 U.S.C. 154(b) by 0 days.

(21) Appl. No.: 14/398,421

(22) PCT Filed: May 2, 2013

(86) PCT No.: PCT/EP2013/059138
§ 371 (c)(1),
(2) Date: Oct. 31, 2014

(87) PCT Pub. No.: WO2013/164400
PCT Pub. Date: Nov. 7, 2013

(65) Prior Publication Data
US 2015/0085465 A1   Mar. 26, 2015

(30) Foreign Application Priority Data

May 3, 2012 (FR) ...................... 12 01296

(51) Int. Cl.
*B29C 45/00* (2006.01)
*B29C 45/16* (2006.01)
(Continued)

(52) U.S. Cl.
CPC .......... *B29C 45/1676* (2013.01); *B29C 45/16* (2013.01); *B60K 37/02* (2013.01);
(Continued)

(58) Field of Classification Search
CPC ...................... B60Q 1/0011; B60Q 3/10–3/14
(Continued)

(56) References Cited

U.S. PATENT DOCUMENTS

| 5,779,339 A | 7/1998 | Konishi et al. |
| 6,412,969 B1 | 7/2002 | Torihara et al. |

(Continued)

FOREIGN PATENT DOCUMENTS

| EP | 0 919 791 A1 | 6/1999 |
| GB | 2 023 834 A | 1/1980 |

(Continued)

OTHER PUBLICATIONS

International Preliminary Report on Patentability and Written Opinion of the International Searching Authority in PCT/EP2013/059138 dated Jul. 26, 2013, 6 pages.

(Continued)

*Primary Examiner* — Evan Dzierzynski
*Assistant Examiner* — Gerald J Sufleta, II
(74) *Attorney, Agent, or Firm* — Foley & Lardner LLP

(57) ABSTRACT

A light guide and covering element, a motor vehicle instrument panel including the same, and a method for manufacturing the same are disclosed. The light guide and covering element include a first portion and a second portion. The first portion of the light guide and covering element are produced from a first transparent material. The second portion of the light guide and covering element are produced from a second opaque material. The first portion of the light guide and covering element and the second portion of the light guide and covering element are made from a single part.

7 Claims, 1 Drawing Sheet

(51) Int. Cl.
*G01D 11/28* (2006.01)
*B60K 37/02* (2006.01)
*G02B 6/10* (2006.01)
*B60Q 3/10* (2017.01)
*B29K 101/12* (2006.01)
*B29L 11/00* (2006.01)
*B29L 31/30* (2006.01)

(52) U.S. Cl.
CPC ............... *B60Q 3/10* (2017.02); *G01D 11/28* (2013.01); *G02B 6/10* (2013.01); *B29K 2101/12* (2013.01); *B29L 2011/0075* (2013.01); *B29L 2031/3008* (2013.01)

(58) Field of Classification Search
USPC ...................... 362/23.07–23.14, 23.16–23.21
See application file for complete search history.

(56) References Cited

U.S. PATENT DOCUMENTS

| | | | | |
|---|---|---|---|---|
| 6,983,717 | B1* | 1/2006 | Fong | G01D 11/28 116/288 |
| 7,527,386 | B1 | 5/2009 | Fox et al. | |
| 7,918,572 | B2* | 4/2011 | Takada | G02B 6/0018 362/23.01 |
| 2011/0157908 | A1* | 6/2011 | Iwai | G02B 6/009 362/509 |
| 2011/0242789 | A1* | 10/2011 | Kato | G01D 11/28 362/23.16 |

FOREIGN PATENT DOCUMENTS

| | | |
|---|---|---|
| JP | 2000-235805 A | 8/2000 |
| JP | 2000-346678 A | 12/2000 |
| JP | 2007-271272 A | 10/2007 |
| WO | WO-2007/002000 A1 | 1/2007 |

OTHER PUBLICATIONS

International Search Report dated Jul. 26, 2013 in PCT/EP2013/059138, 3 pages.
Preliminary Examination Report and Written Opinion in FR 1201296 dated Jan. 15, 2013, 7 pages.
Japanese Office Action and English translation, Application No. 2015-509439, Feb. 21, 2017, 9 pages.

* cited by examiner

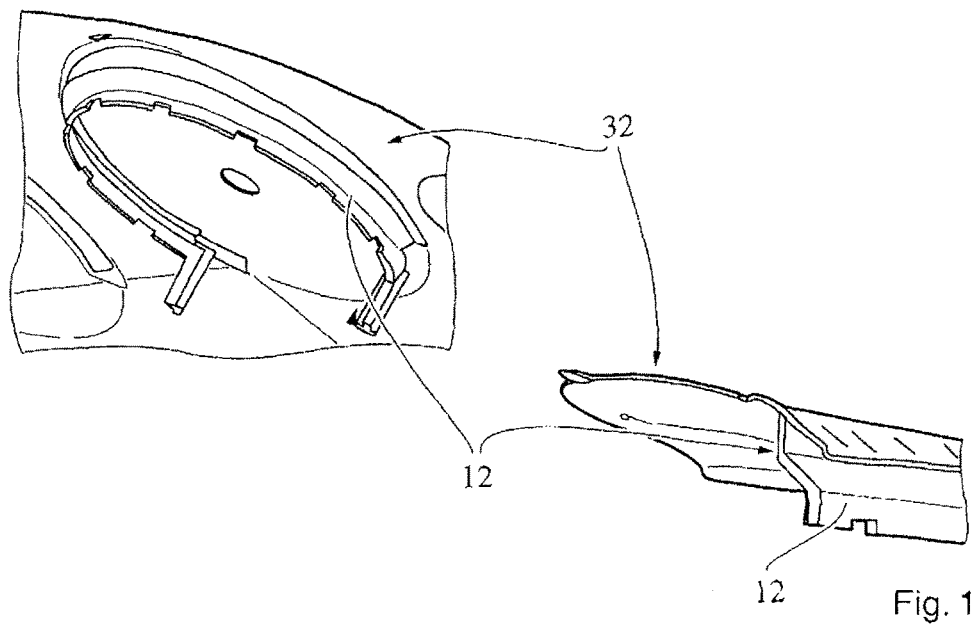
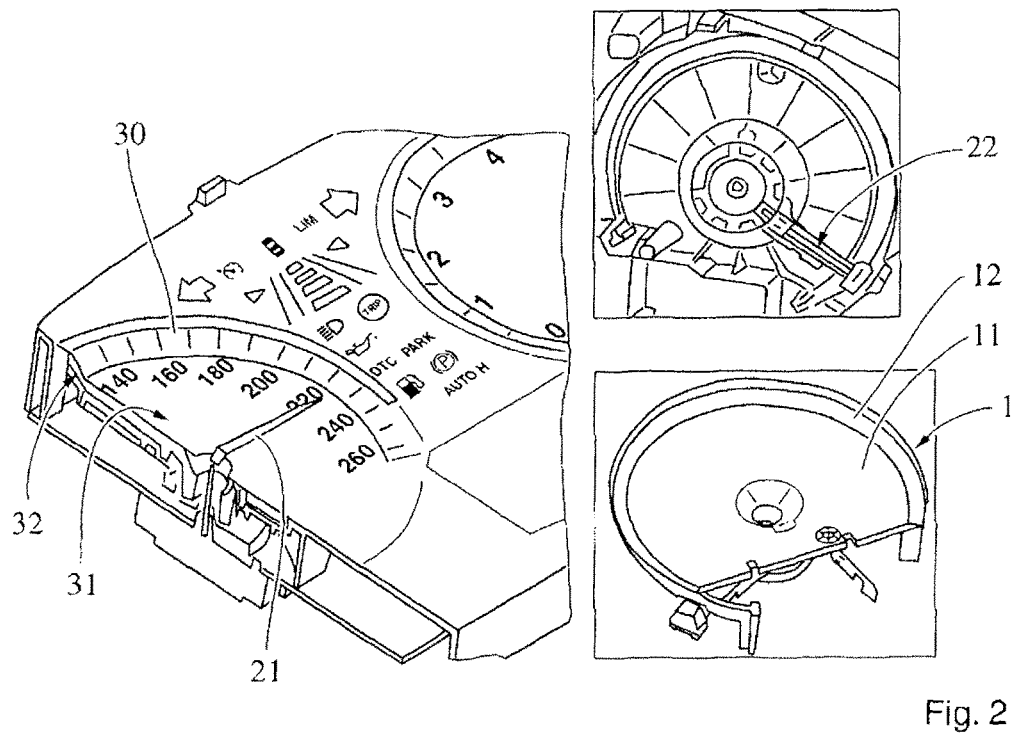

LIGHT GUIDE AND COVERING ELEMENT, INSTRUMENT PANEL AND METHOD FOR MANUFACTURING A DECORATIVE ELEMENT

CROSS REFERENCE TO RELATED APPLICATIONS

The present application is a U.S. National Stage of International Application No. PCT/EP2013/059138 filed on May 2, 2013, which claims the benefit of French Patent Application No. 12/01296 filed on May 3, 2012, the entire disclosures of all of which are incorporated herein by reference.

The present invention relates to a light guide and covering element, to an instrument panel, notably for a motor vehicle, and to a method of manufacturing a light guide and covering element.

Light guide elements are known, notably for instrument panels, and notably for motor vehicles.

Moreover, it is known practice to position a covering element in such a way as to cover a light guide element from the rear when the instrument panel comprises a first indicator instrument with a pointer in front of a display surface (from the viewpoint of the normal position of view of a user of the instrument panel) and a second indicator instrument with a pointer behind the display surface, the covering element preventing light from the second pointer-type indicator instrument from being visible by a user at locations that do not correspond to that part of the display surface that is reserved for the second pointer-type indicator instrument.

Also, instrument panels such that elements interact with springs in order to position them correctly are known. Such a device is, for example, known from publication U.S. Pat. No. 7,527,386 B1.

Such an instrument panel has the disadvantage that instrument panel assembly is complicated and leads to high costs.

It is a notable objective of the present invention to alleviate the disadvantages of the known art, notably those mentioned hereinabove, and another objective is to propose a light guide and covering element and a vehicle instrument panel that can be produced in a simple and effective way and that has an advantageous attractive appearance.

According to the invention, this objective is achieved using a light guide and covering element notably for use associated with a motor vehicle instrument panel, the light guide and covering element comprising a first part and a second part, the first part of the light guide and covering element being made of a transparent first material, the second part of the light guide and covering element being made of an opaque second material, characterized in that the first part of the light guide and covering element and the second part of the light guide and covering element are made of a single piece.

Through such an embodiment of the light guide and covering element, it is advantageously possible to reduce or eliminate the assembly tolerances between the first part of the light guide and covering element and the second part of the light guide and covering element. This not only makes it possible to improve the attractive appearance of the light guide and covering element, notably when the second part of the light guide and covering element is illuminated notably from behind the light guide and covering element (from a viewpoint of the normal position of view of a user of the instrument panel)—but also makes it possible to reduce the costs associated with the light guide and covering element.

One preferred improvement of the invention lies in the fact that the first part of the light guide and covering element and the second part of the light guide and covering element are made using two-stage injection molding.

According to one preferred embodiment of the light guide and covering element according to the present invention, the first part of the light guide and covering element and the second part of the light guide and covering element are made using two-component injection molding.

By producing the light guide and covering element in such an inventive way it is advantageously possible to minimize the effort involved in manufacturing the light guide and covering element and to reduce assembly tolerances as far as possible.

According to one preferred embodiment of the present invention, provision is made for the second material to have the property of being more flexible than the first material.

Thus, it is advantageously possible according to the present invention to plan—when the light guide and covering element is being mounted with the other elements of the instrument panel—for the light guide and covering element to be positioned in contact, notably via the second part thereof, with a decorative element of the instrument panel, notably in the form of a partially transparent or translucent film which is visible from the outside, namely from a normal position of view of a user of the instrument panel.

Another preferred improvement of the invention lies in the fact that the first material contains
polymethylmethacrylate (PMMA) and/or
polycarbonate (PC)
or a composition of these materials.

Through such an inventive way of producing the instrument panel, it is advantageously possible to confer upon the first part of the light guide and covering element the desired degree of transparency, notably for producing tile or display regions for optical elements alerting or informing a user of a motor vehicle instrument panel.

Moreover, the present invention also relates to a motor vehicle instrument panel comprising at least one inventive light guide and covering element.

By producing it in such a way it is advantageously possible to increase the level of safety of the motor vehicle because the user, notably the driver of the motor vehicle, can concentrate on the important information and is not distracted by reflections, namely light which, coming from the second indicator instrument with indicator instrument with a pointer, spreads and is therefore visible in a way and at locations that are not desired by a user of the instrument panel.

Another preferred embodiment according to the present invention relates to an instrument panel comprising a display device, the display device having a display zone with a first indicator instrument with a pointer that can be turned about an axis of rotation, the display zone having a first part that is central with respect to the axis of rotation and a peripheral second part, a second indicator instrument with a pointer being provided for at least partially illuminating the peripheral second part of the display zone, the second part of the light guide and covering element being designed to limit the illumination by the second indicator instrument with a pointer to the peripheral second part.

By embodying the display method in this way it is advantageously possible to create a display that has an advantageous attractive appearance and also contributes to increasing the level of safety of the motor vehicle.

The present invention also relates to an inventive light guide and covering element method of manufacture, the method comprising the following step:

in one stage of the method, the first part and the second part of the light guide and covering element are produced using two-stage injection molding or using two-component injection molding.

Other features and advantages of the invention will emerge from reading the following description of one non-limiting particular embodiment of the invention.

BRIEF DESCRIPTION OF THE DRAWINGS

The invention will be better understood by virtue of the description which follows, which refers to preferred embodiments given by way of nonlimiting examples and explained with reference to the attached schematic drawings in which:

FIG. 1 is a schematic perspective view and a schematic sectioned view of a second part of a light guide and covering element according to the present invention, and FIG. 2 is a schematic perspective and sectioned view of part of an instrument panel, and a schematic view of a light guide and covering element according to the present invention.

DESCRIPTION OF THE DRAWINGS

A display device of an instrument panel according to the present invention normally comprises a display surface or a display zone 30, notably comprising at least one dial.

A first indicator instrument with a pointer 21 is associated with the display zone 30, the first indicator instrument with a pointer 21 being able to be driven in rotation about an axis of rotation.

The display zone has a first part 31 that is central with respect to the axis of rotation and a peripheral second part 32, a second indicator instrument with a pointer 22 being provided for at least partially illuminating the peripheral second part 32 of the display zone 30. For this purpose, the second indicator instrument with a pointer 22 is preferably an indicator instrument with a pointer that is (hidden) behind (from a normal viewpoint of a user) the plane of the display zone 30 and which is also able to be driven in rotation about an axis of rotation, preferably the same axis of rotation of the first indicator instrument with indicator instrument with pointer 21.

The second part 12 of the light guide and covering element 1 is designed to limit the illumination, by the second indicator instrument with pointer 22, of the peripheral second part 32, namely to prevent light emanating from the second indicator instrument with pointer 22 being visible (by a user of the inventive instrument panel) in other parts of the display zone 30 than the peripheral second part 32. Thus, reflections, and therefore the risk of a user being distracted from driving the motor vehicle, can be avoided.

According to the present invention, it is proposed to produce the light guide and covering element 1 having a first part 11 and a second part 12 as shown by FIGS. 1 and 2 of the attached drawing.

FIG. 1 shows a schematic perspective view and a schematic sectioned view of the second part 12 of a light guide and covering element 1 according to the present invention.

FIG. 2 shows a schematic perspective and sectioned view of part of an instrument panel, and a schematic view of a light guide and covering element 1 according to the present invention.

The light guide and covering element 1 according to the present invention comprises, in its second part 12, a region in which the light guide and covering element 1 is covered via its rear face so that the light from the second indicator instrument with pointer 22 does not enter the central part of the light guide and covering element 1 (which corresponds to the central first part 31 of the display zone 30).

The first part 11 and the second part 12 of the light guide and covering element 1 are connected, notably forming a single piece. The first part 11 of the light guide and covering element 1 comprises a first material and the second part 12 of the light guide and covering element 1 comprises a second material. The first material is notably different than the second material in terms of its physical and/or chemical properties.

For example, the first material contains polymethylmethacrylate (PMMA) and/or polycarbonate (PC)
or a composition of these materials.

For example, the second material comprises a material that is more opaque but more flexible than the first material. Thus it is possible to position the light guide and covering element 1 in such a way that it presses against a decorative element which is positioned, with respect to the light guide and covering element 1, in the direction of the user of the instrument panel.

According to the present invention, the first part 11 is optically more transparent, notably completely transparent (as compared with the transparency that can be achieved with the first material, and the second part 12 is optically opaque.

It is preferable for the two parts 11, 12 of the light guide and covering element 1 to be manufactured using two-stage injection molding or two-component injection molding. It is also possible for the light guide and covering element to be produced using three-stage (or more than three-stage) injection molding or using three-component (or more than three-component) injection molding.

LIST OF REFERENCE SYMBOLS 1 light guide and covering element
11 first part of the light guide and covering element
12 second part of the light guide and covering element
21 first indicator instrument with pointer
22 second indicator instrument with pointer
30 display zone
31 central first part
32 peripheral second part

The invention claimed is:

1. A light guide and covering element for use associated with a motor vehicle instrument panel, the light guide and covering element comprising:
   a first part including an opening defined in the first part, the opening configured to receive an indicator instrument, the first part extending from the opening to a periphery outward from the opening; and
   a second part extending from the periphery of the first part,
   wherein the first part of the light guide and covering element is made of a transparent first material,
   wherein the second part of the light guide and covering element is made of an opaque second material,
   wherein the first part of the light guide and covering element and the second part of the light guide and covering element are made of a single piece, wherein the second material has the property of being more flexible than the first material;

wherein the motor vehicle instrument panel defines a display zone including a first display zone part central with respect to an axis of the opening of the first part and a second display zone part peripheral to the first display zone part, wherein the second part of the light guide and covering element is designed such that light for at least partially illuminating the second display zone part does not enter the first display zone part.

2. The light guide and covering element as claimed in claim 1, wherein the first part of the light guide and covering element and the second part of the light guide and covering element are made using two-stage injection molding.

3. The light guide and covering element as claimed in claim 1, wherein the first part of the light guide and covering element and the second part of the light guide and covering element are made using two-component injection molding.

4. The light guide and covering element as claimed in claim 1, wherein the first material contains
polymethylmethacrylate (PMMA)
and/or
polycarbonate (PC)
or a composition of these materials.

5. A motor vehicle instrument panel comprising at least one light guide and covering element as claimed in claim 1.

6. A method of manufacturing a light guide and covering element as claimed in claim 1, wherein in one stage of the method, the first part and the second part of the light guide and covering element are produced using two-stage injection molding or using two-component injection molding.

7. A motor vehicle instrument panel, comprising:
at least one light guide and covering element comprising:
a first part including an opening configured to receive an indicator instrument; and
a second part extending from a periphery of the first part, wherein the first part of the light guide and covering element is made of a transparent first material, the second part of the light guide and covering element is made of an opaque second material, the first part of the light guide and covering element and the second part of the light guide and covering element are made of a single piece, and the second material has the property of being more flexible than the first material; and
a display device, the display device having a display zone with a first indicator instrument with a first pointer that can be turned about an axis of rotation, the display zone having a first part that is central with respect to the axis of rotation and a peripheral second part, a second indicator instrument with a second pointer being provided for at least partially illuminating the peripheral second part of the display zone, the second part of the light guide and covering element being designed to limit the illumination by the second indicator instrument with a pointer to the peripheral second part.

* * * * *